(12) United States Patent
Griffin

(10) Patent No.: US 9,589,263 B2
(45) Date of Patent: Mar. 7, 2017

(54) AUTOMATIC PAYMENT CODE DISPLAY SYSTEM

(71) Applicant: PAYPAL, INC., San Jose, CA (US)

(72) Inventor: Kent Griffin, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 263 days.

(21) Appl. No.: 14/317,626

(22) Filed: Jun. 27, 2014

(65) Prior Publication Data

US 2015/0379506 A1 Dec. 31, 2015

(51) Int. Cl.
G06Q 20/32 (2012.01)
G06Q 20/38 (2012.01)
G06Q 20/10 (2012.01)
G06Q 20/12 (2012.01)
G06Q 20/20 (2012.01)

(52) U.S. Cl.
CPC ........... *G06Q 20/327* (2013.01); *G06Q 20/10* (2013.01); *G06Q 20/12* (2013.01); *G06Q 20/20* (2013.01); *G06Q 20/322* (2013.01); *G06Q 20/3224* (2013.01); *G06Q 20/385* (2013.01)

(58) Field of Classification Search
CPC .......................... G06Q 20/385; G06Q 20/327
See application file for complete search history.

(56) References Cited

U.S. PATENT DOCUMENTS

| 2012/0101887 A1* | 4/2012 | Harvey | G06Q 10/00 705/14.23 |
| 2014/0188708 A1* | 7/2014 | Govindarajan | G06Q 20/202 705/39 |
| 2014/0344082 A1* | 11/2014 | Soundararajan | G06Q 20/40 705/16 |
| 2014/0344151 A1* | 11/2014 | Soundararajan | G06Q 20/322 705/44 |
| 2014/0364148 A1* | 12/2014 | Block | H04W 4/02 455/456.3 |

* cited by examiner

*Primary Examiner* — Eric T Wong
(74) *Attorney, Agent, or Firm* — Haynes and Boone, LLP

(57) ABSTRACT

Automatic payment code display systems and methods include a user device detecting a beacon system at a physical merchant location. The user device establishes a background communication process with the beacon system that occurs without user intervention subsequent to detecting the beacon system. The user device then provides the user account authentication token to the beacon system as part of the background communication process. The user device then receives a payment code from the beacon system as part of the background communication process. The user device then causes the payment code to be displayed, and the displayed payment code is configured to be utilized by a payment processing device at the physical merchant location in a payment transaction. The payment code may be caused to be displayed on a lock screen in a background display process that occurs without user intervention.

20 Claims, 14 Drawing Sheets

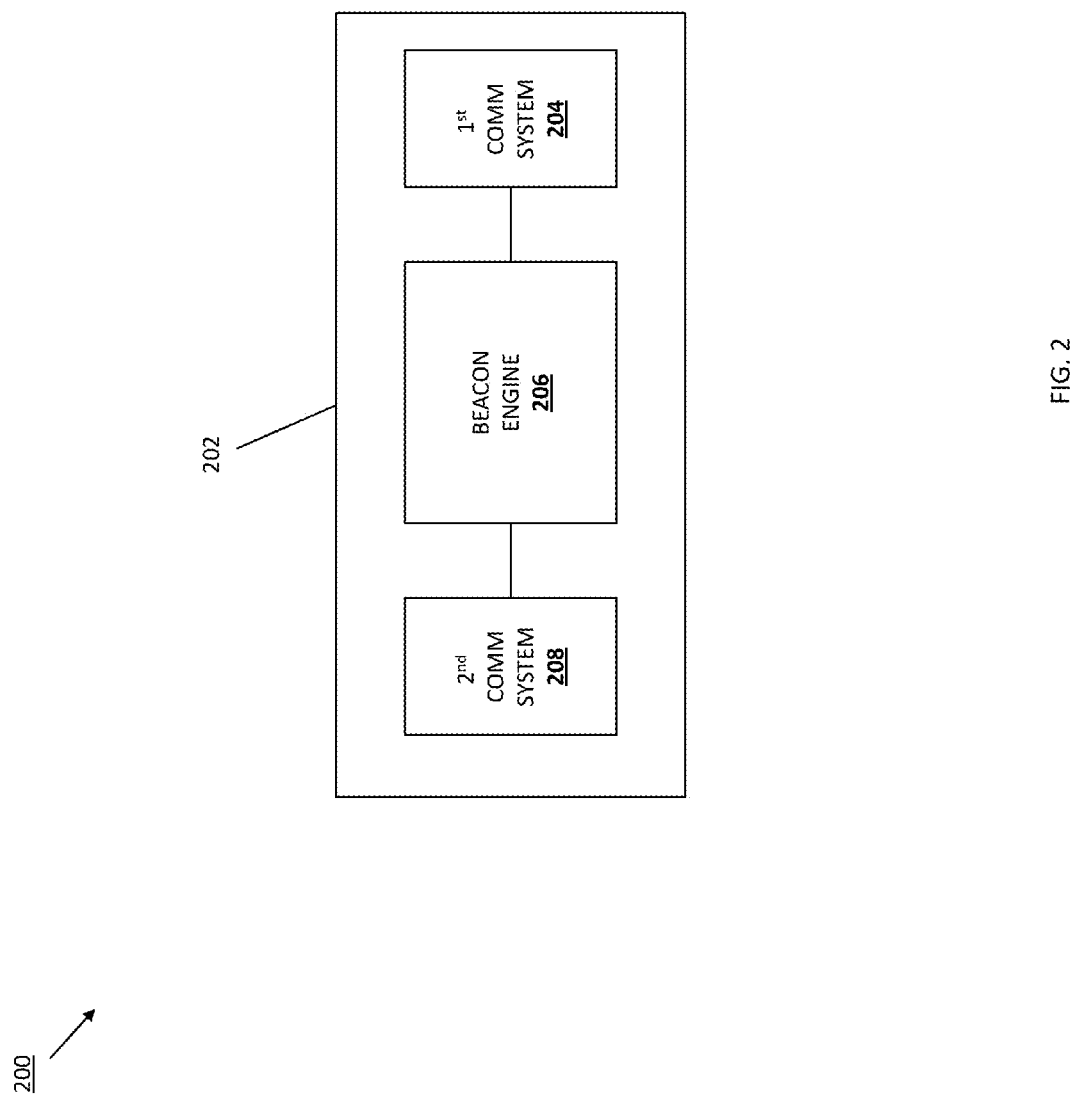

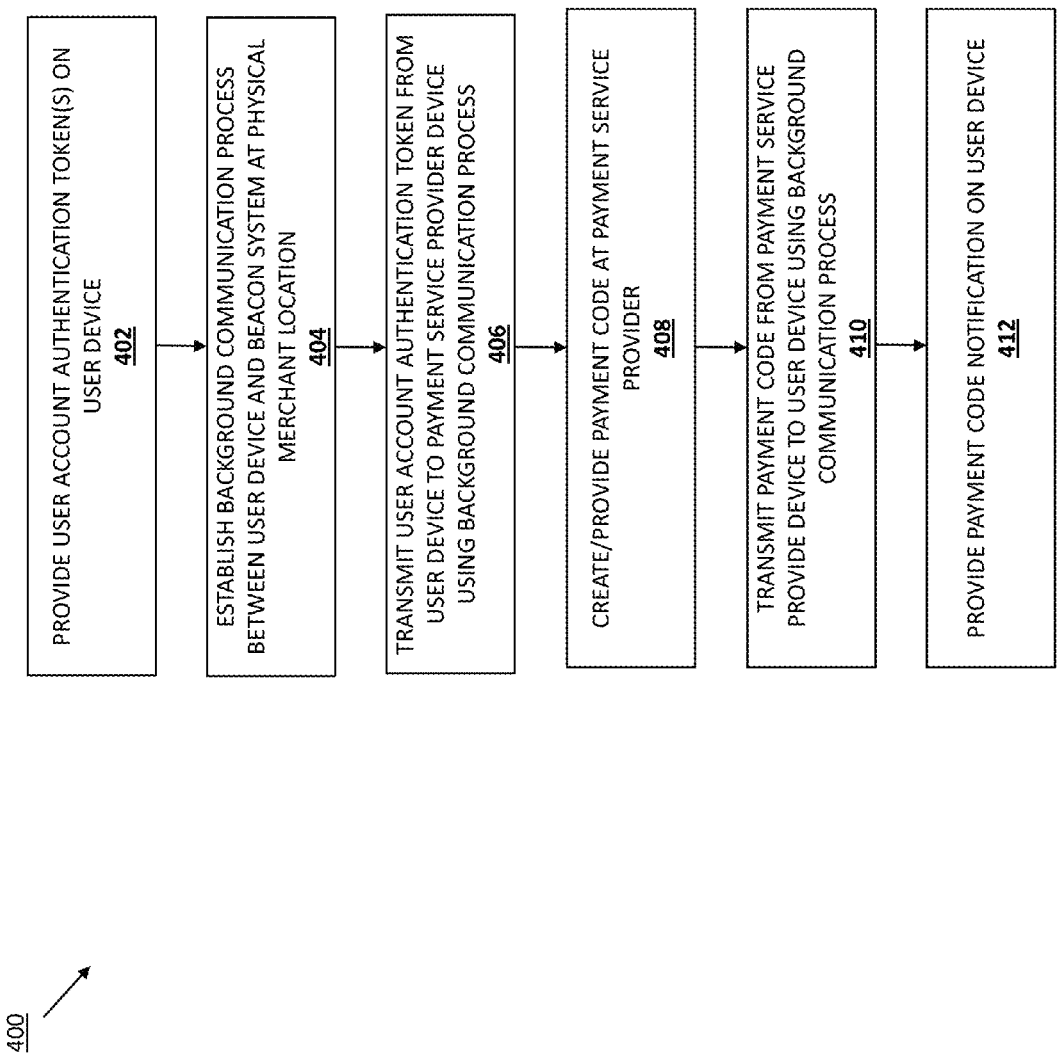

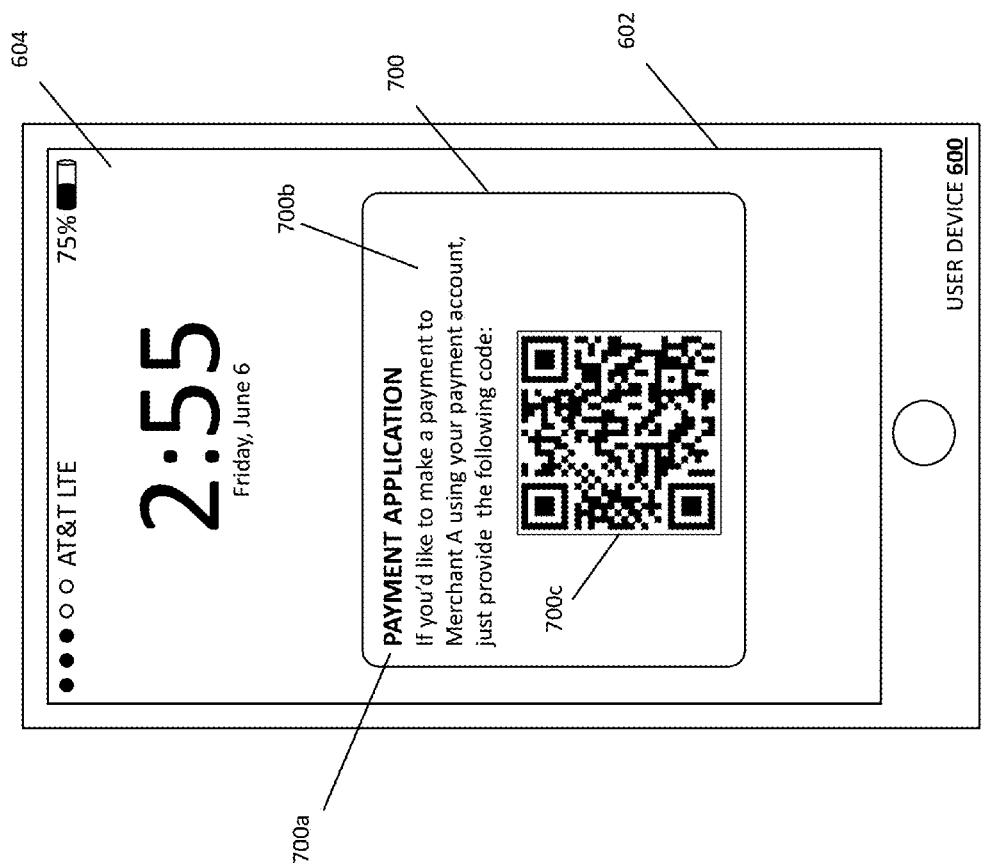

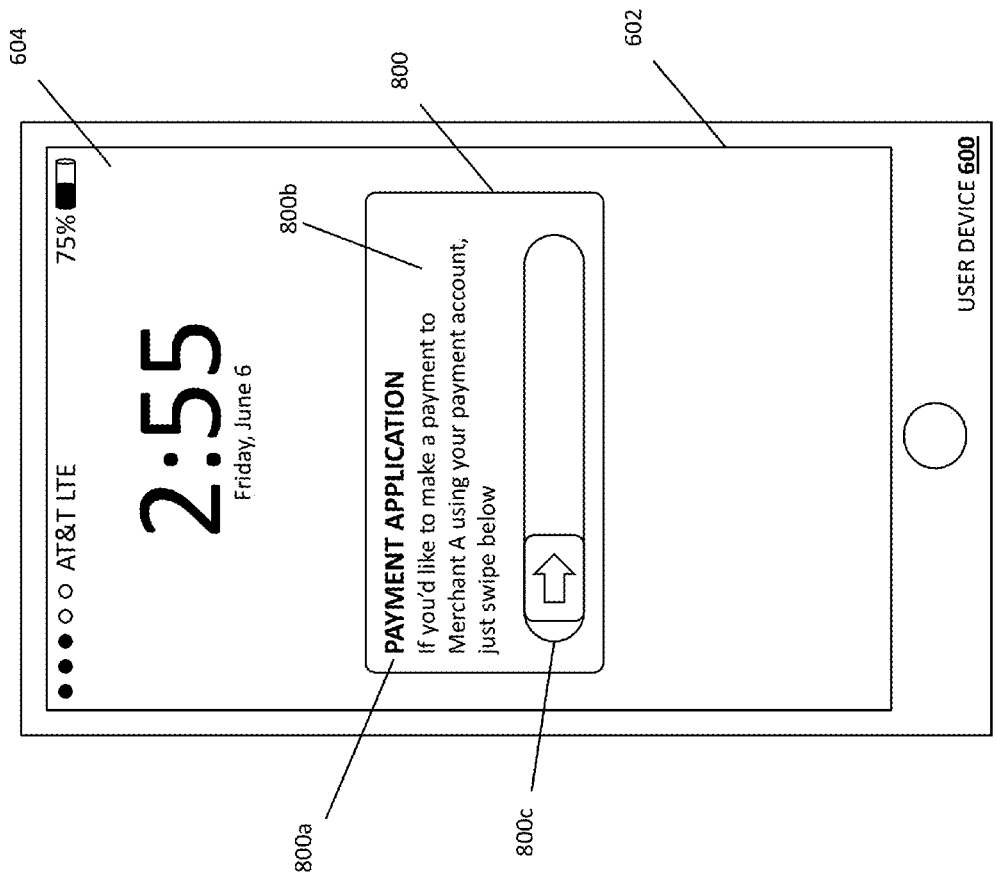

AUTOMATIC PAYMENT CODE DISPLAY SYSTEM

BACKGROUND

Field of the Disclosure

The present disclosure generally relates to online and/or mobile payments, and more particularly to systems and methods for displaying payment codes automatically on a user device for use in making online and/or mobile payments.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

Some payment service providers provide online and mobile payment services for merchants with physical merchant locations and their customers. For example, payment service providers may provide the online and/or mobile payment services discussed above for utilization at physical merchant locations to allow customers to purchase products offered by the merchant using a customer device such as a mobile phone device or other portable computing device. The utilization of such customer devices frees the customer from having to carry around payment cards, such as credit cards or debit cards, in order to make payments. However, the conventional use of customer devices to make payments raises a number of issues.

The conventional use of a customer devices to make a payment typically requires the following actions by the customer: unlocking of the customer device (e.g., by providing a user action such as a "swipe", or by providing user credentials such as a passcode or thumb scan), opening up a payment application, finding and selecting the merchant (via the payment application) to which the payment is to be made, authenticating to the payment application, instructing the payment application to generate a payment code, and providing the payment code to the merchant. It has been found that this cumbersome process discourage the use of customer devices in making payments, as typical customers find it easier and quicker to simply carry around and provide a payment card to the merchant. The results of these and similar issues with payments using customer devices have slowed the adoption of customer device payment systems.

Thus, there is a need for an improved customer device payment system.

BRIEF DESCRIPTION OF THE FIGURES

FIG. 2 is a schematic view illustrating an embodiment of a beacon device;

FIG. 4 is a flow chart illustrating an embodiment of a method for automatically displaying payment codes;

FIG. 7 is a front view illustrating an embodiment of a user device automatically displaying a payment code.

FIG. 8a is a front view illustrating an embodiment of a user device automatically displaying a payment code notification.

FIG. 8b is a front view illustrating an embodiment of a customer device automatically displaying a payment code following a user input in response to the payment code notification of FIG. 8a.

Figure 1:
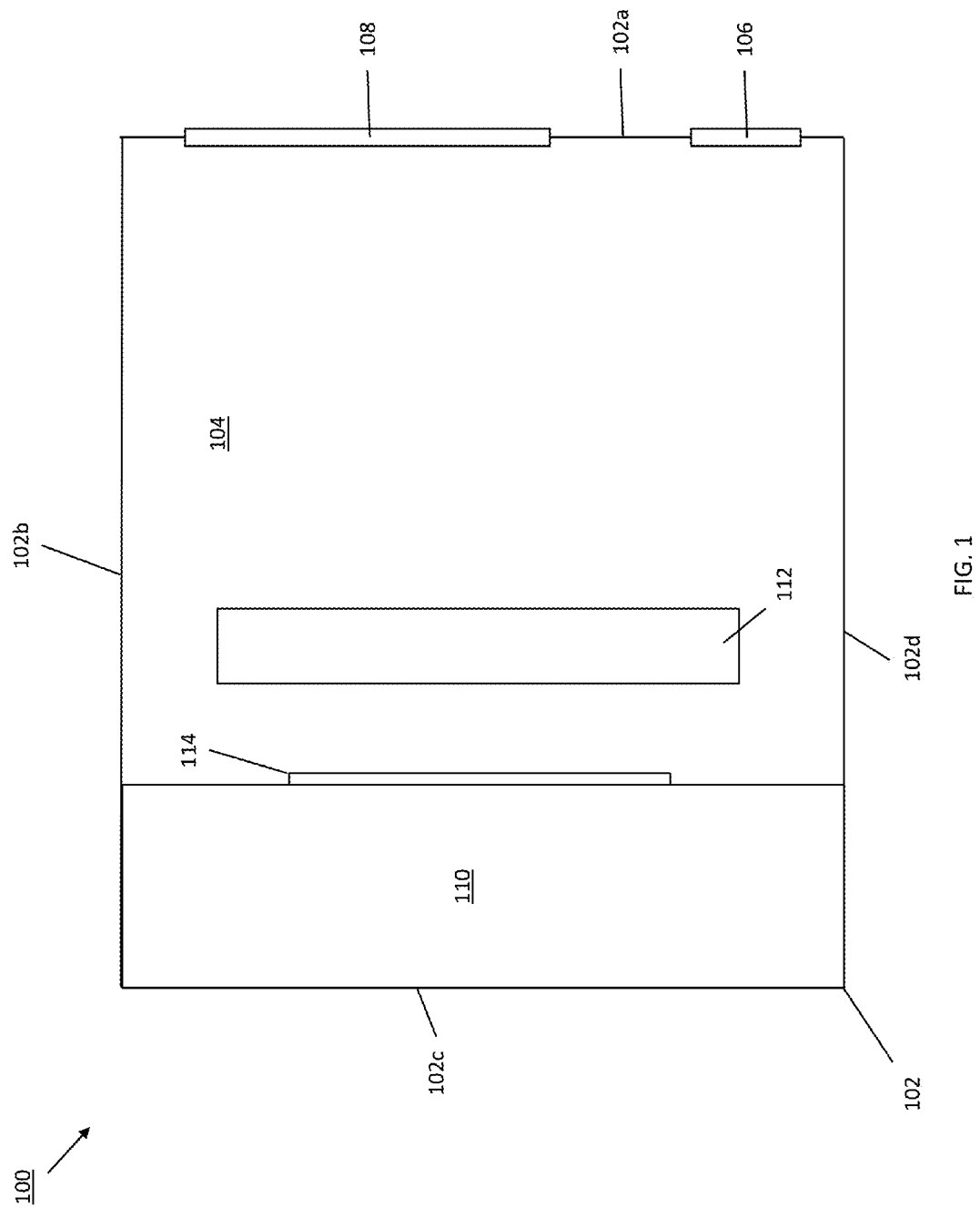
FIG. 1 is a schematic top view illustrating an embodiment of a physical merchant location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for automatically retrieving and displaying a payment code using background communication and display processes that occur without user intervention. A user with a user device may enter a physical merchant location of a merchant that includes a beacon system or other communication system that is configured to perform a background communication process with the user device. The background communication process is established between the user device and the beacon system without the user providing any instruction or input to the user device subsequent to entering a communication area provided by the beacon system at the physical merchant location, and operates to communicate a user account authentication token from the user device to the beacon system. The beacon system then forwards that user account authentication token to a payment service provider device, and the payment service provider device generates a payment code that may be associated with a user account of the user and a merchant account of the merchant. The payment service provider device then sends the payment code to the beacon system, and the beacon system provides the payment code to the user device as part of the background communication process. The user device may then operate to display the payment code to the user via a background display process on the user device, and may inform the user that the payment code is available to make a payment to the merchant at the merchant physical location if the user wishes to purchase a product or service from that merchant. As such, a user may be automatically presented with a payment code for making purchases from a merchant upon entering a physical merchant location of that merchant, without the need for the user to provide any instructions to their user device and/or the need for an application to be launched or open on the user device. As such, the utilization of the user device in making payments to merchants is greatly simplified for users, providing a level of convenience that increases the likelihood of user device payment system adoption.

Referring now to FIG. 1, an embodiment of a physical merchant location 100 is illustrated. The physical merchant location 100 includes a merchant building 102 having a plurality of exterior walls 102a, 102b, 102c, and 102d that define a physical merchant location interior 104. The exterior wall 102a includes an exterior door 106 (e.g., a "front" door in the illustrated embodiment) and an exterior window 108. In the illustrated embodiment, the physical merchant location interior 104 includes a merchant employee area 110, a counter 112, and a product display 114 located behind the counter 112.

In one example, the physical merchant location 100 is a restaurant, the merchant employee area 110 is a kitchen, the counter 112 is an ordering counter, and the product display 114 is a menu that displays food or drinks that are available for purchase at the physical merchant location 100 through the exterior window 116. However, while a specific example of a restaurant is provided and discussed below to provide an example of one use of the automatic payment code display system of the present disclosure, one of skill in the art in possession of the present disclosure will recognize that a wide variety of physical merchant locations will benefit from the teachings of the present disclosure, and any merchant that is enabled to accept payments via the payment codes discussed below will fall within the scope of the present disclosure.

Referring now to FIG. 2, an embodiment of a beacon device 200 is illustrated. The beacon device 200 includes a chassis that houses a first communications system 204 such as, for example, a Wifi communications system, a cellular communication system, and/or a variety of other communication systems known in the art. The first communications system 204 is coupled to a beacon engine 206 that may be provided by instructions on a memory system (not illustrated) in the beacon device 200 that, when executed by a processing system (not illustrated) in the beacon device 200, cause the processing system to perform the functions of the beacon devices 200 discussed below. The beacon engine 206 is coupled to a second communication system 208 such as, for example, a Bluetooth® Low Energy (BLE) communication system, a BLE direct communication system, and/or a variety of other communication systems known in the art. The beacon engine 206 may be configured to receive any of a variety of signals through the second communication system 208 and transmit those signals using the first communication system 204. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device 200 to be provided in a relatively small form factor such that it may be placed inconspicuously almost anywhere. The chassis 202 of the beacon device 200 may include any of a variety of features that allow for the coupling of the beacon device to different areas in a physical merchant location, discussed below.

Figure 3A:
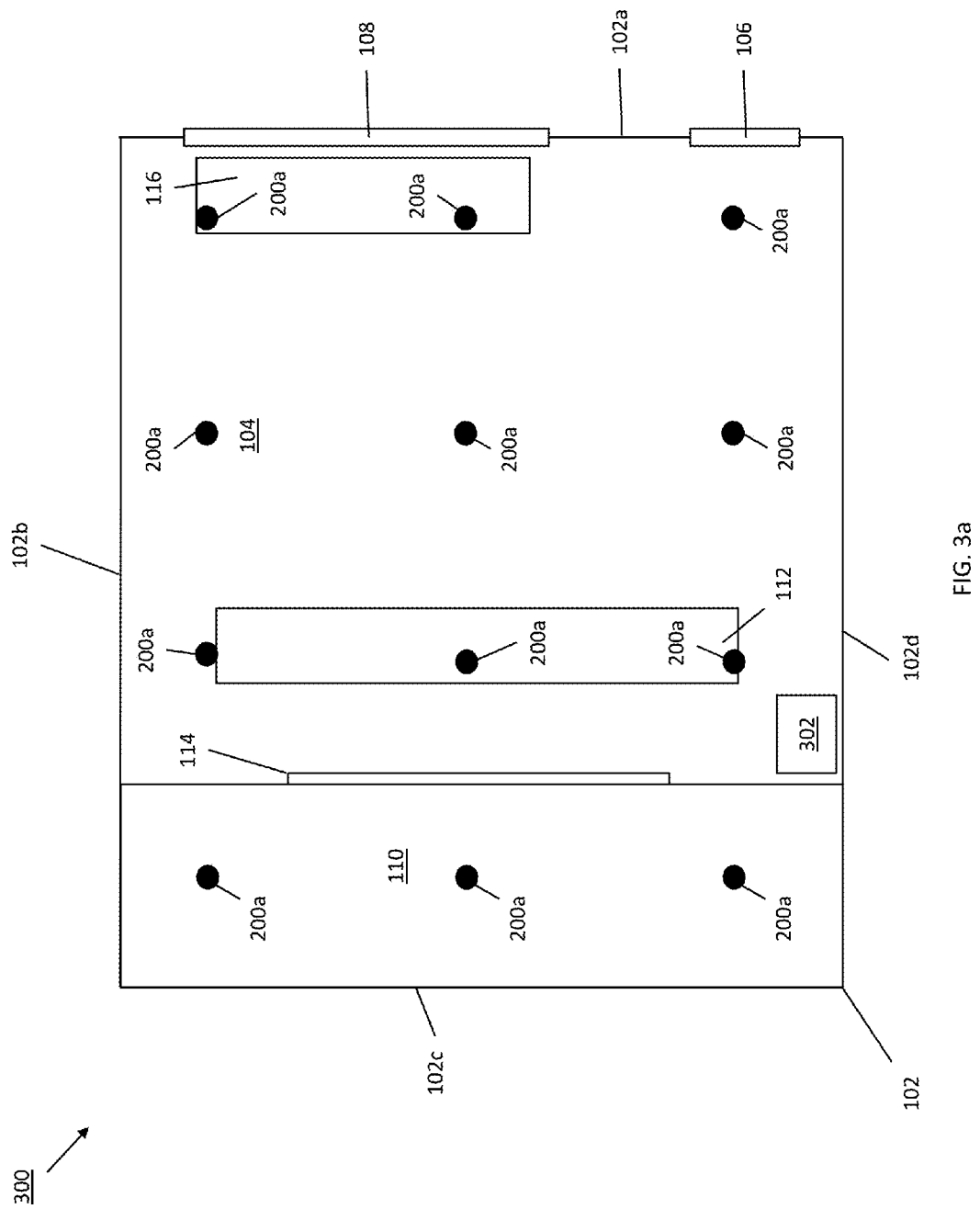
FIG. 3a is a schematic top view illustrating an embodiment of a beacon system that includes a plurality of the beacon devices of FIG. 2 in the physical merchant location of FIG. 1.
Figure 3B:
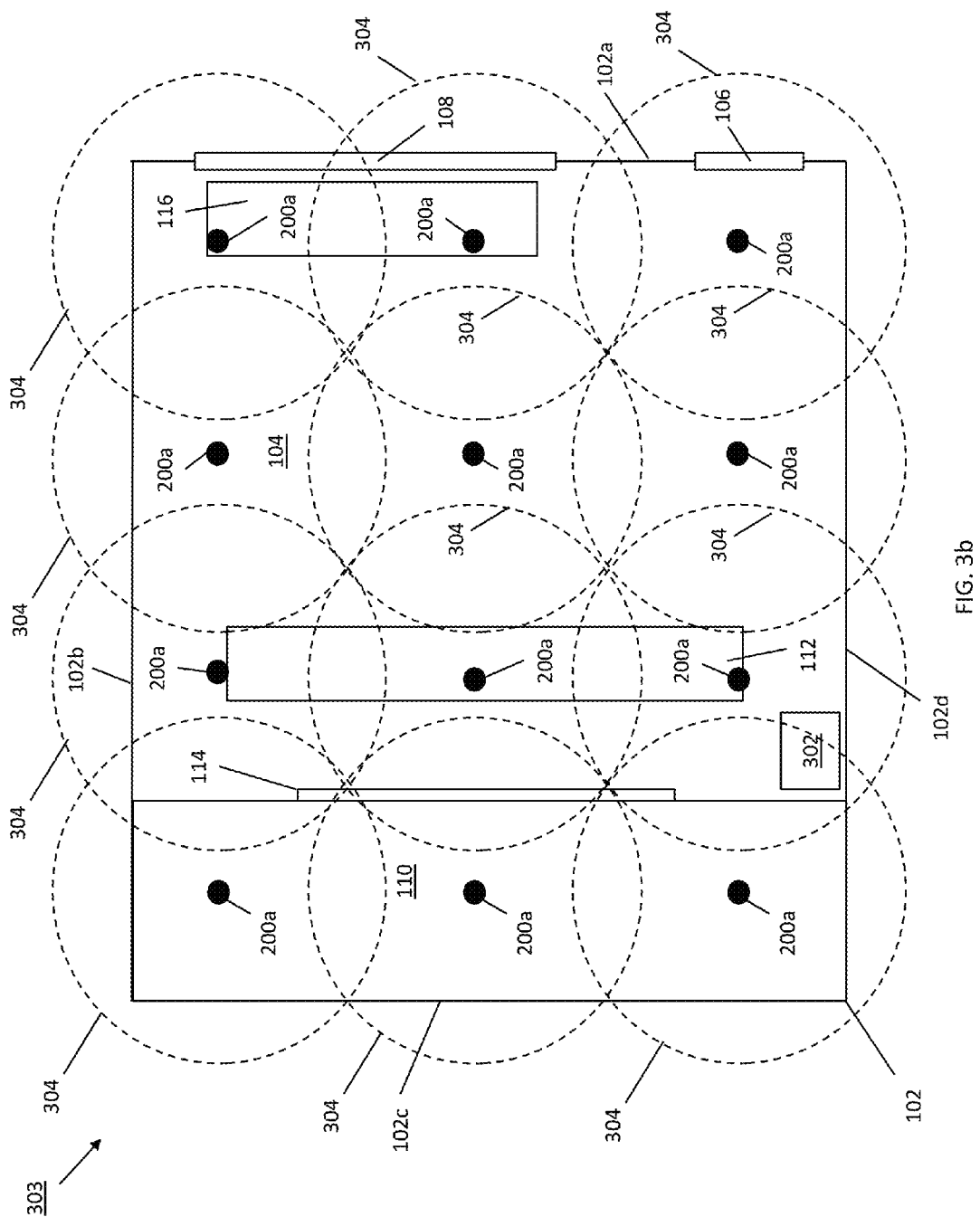
FIG. 3b is a schematic top view illustrating an embodiment of a portion of an automatic payment code display system with the beacon system of FIG. 3a providing a plurality of communication areas.

Referring now to FIGS. 3a and 3b, an embodiment of a beacon system 300 is illustrated. As illustrated in FIG. 3a, the beacon system 300 may be provided by positioning a plurality of the beacon devices 200, discussed above with reference to FIG. 2, in and around the physical merchant location 100, discussed above with reference to FIG. 1. In the illustrated embodiment, a plurality of the beacon devices 200a are positioned in and around the physical merchant location 100. As discussed above, the beacon devices 200a may be sized such that they may be inconspicuously positioned virtually anywhere in or around the physical merchant location 100. For example, the beacon devices 200a may be positioned on the ceiling of the physical merchant location 100, in the product counter 112, and virtually anywhere else in the physical merchant location 100. Each of the beacon devices 200a in the beacon system 300 may be configured to wirelessly communicate, via its first communications system 204, with a merchant network communication device 302 such as, for example, a Wifi wireless router connected to a network such as the Internet, and merchant device connected to one or more network, and/or a variety of other network communication devices known in the art. As such, the merchant network communication device 302 may also include a variety of computing devices such as desktop computing systems, laptop/notebook computing systems, server computing systems, and/or a variety of other computing systems known in the art.

Referring now to FIG. 3b, the operation of the beacon system 300 may provide a portion 303 of the automatic payment code display system discussed in further detail below. Each of the beacon devices 200a is configured to create a communication area 304 using its second communications system 208. For example, the second communications system 204 in each beacon device 200a may be BLE communications device that provides an approximately 100 foot radius communications area. However, other communications systems providing other communications areas are envisioned as falling within the scope of the present disclosure. As can be seen in the illustrated embodiment, the beacon devices 200a may be positioned in and around the physical merchant location 100 such that the communications areas 304 abut, overlap, or otherwise provide coverage for any area of interest within and around the physical merchant location 100. As such, different configurations of the beacon devices 200a within and around the physical merchant location 100 may be selected to cover any area within and around the physical merchant location 100 with a communications area 304. As discussed in further detail below, each of the beacon devices 200a are configured to communicate with user devices within their respective communications area 304 (e.g., using the second communication system 208) to collect data, and then send that data to the merchant network communication device 302 (e.g., using the first communication system 204) such that the data may be provided to a merchant device, a system provider device, and/or any other device operating to provide the display of automatic payment codes as discussed below. One of skill in the art will recognize that the use of BLE communication devices or BLE direct communication devices for communication between the beacon devices 200a and user devices may be utilized to provide for low power communications via a background communication process with a user device (e.g., when the user device is not being actively used by the user, or when the user device is being used for reasons other than communication with the beacon device 200*a* and without instruction from the user to communicate with the beacon devices 200*a*.)

In the embodiments illustrated and discussed below, the beacon devices 200 and their communications areas 304 are not illustrated for clarity of illustration and discussion, but it should be understood that the communications between and retrieval of information from user devices by the beacon system 300, and that provision of that information to a system provider device such that the payment service provider devices discussed below, may be accomplished using beacon devices providing communications areas such as the beacon devices 200 and communications areas 304 illustrated in FIGS. 3*a* and 3*b*. However, in some embodiments, the beacon devices 200*a* may be omitted from the portion 303 of the automatic payment code display system and any communications between the user devices and the system provider devices may be provided over other networks (e.g., Local Area Networks (LANs), the Internet, cellular networks, etc.) Thus, while a specific example of a portion 303 of the automatic payment code display system is provided, one of skill in the art in possession of the present disclosure will recognize that a wide variety of different physical merchant locations may incorporate the beacon devices 200 or other communication systems in a variety of manners while remaining within its scope.

In the embodiments discussed below, the automatic payment code display system and methods involve a system provider such as a payment service provider using a system provider device such as a payment service provider device to retrieve information collected by the beacon devices 200 from user devices through a network (e.g., the Internet). In such embodiments, the system provider may associate the physical merchant location 100 (or its merchant), the beacon devices 200, merchant devices, and/or other components of the system with a merchant account or a physical merchant location account in a database located in a non-transitory memory. As such, information received from the beacon devices and merchant devices may be associated with the merchant account or physical merchant location account in the database, and any of that information may be stored in associated with that merchant account or physical merchant location account. In other embodiments, the system provider device may include a merchant device that is local to the physical merchant location 100 and that communicates with the beacon devices 200 using the merchant network communication device 302.

FIGS. 1, 3*a*, and 3*b* illustrate a physical merchant location 100 that is a single building, and the beacon devices 200*a* are positioned to provide communications areas 304 that cover the interior of that single building and an area outside the front of that single building. However, beacon devices 200 may be positioned virtually anywhere to retrieve information associated with a physical merchant location 100. For example, the physical merchant location 100 may be located adjacent to or associated with a parking lot, and beacon devices may be positioned around that parking lot, at the entrances or exits of that parking lot, and/or anywhere else relative to that parking lot in order to communicate with user devices, exchange information with user devices, and provide information to the system provider device. In another example, the physical merchant location may be located in a mall, and beacon devices may be positioned around that mall, at the entrances or exits of that mall, and/or anywhere else relative to that mall in order to communicate with user devices, exchange information with user devices, and provide information to the system provider device. In some examples, the first communication system may be connected to Wifi networks available outside the physical merchant location in order to communicate and exchange information with the user devices. In other examples, the first communication system may be a cellular communications system that allows the beacon devices to be positioned anywhere in range of a cellular communications tower, allowing beacon devices associated with the merchant to be positioned in virtually any physical location when providing the automatic payment code display system.

Referring now to FIG. 4, an embodiment of a method 400 for automatically displaying a payment code is illustrated. The method 400 begins at block 402 where user account authorization tokens are provided on a user device of a user. In the embodiments discussed below, a payment service provider such as, for example, PayPal, Inc. of San Jose, Calif., acts as a system provider that provide payment codes that may be utilized in payment transactions between a merchant and a user to allow a user to purchase products and/or services (hereinafter, "products") from the merchant. As such, the payment service provider is associated with one or more payment service provider devices/system provider devices that operate to perform the functions of the payment service provider devices/system provider devices discussed below. However, account providers (e.g., checking account providers, credit account providers, etc.) and/or other entities may perform the functions of the system providers discussed below while remaining within the scope of the present disclosure.

In embodiments where the payment service provider is the system provider, the payment service provider may provide payment service accounts to both merchants and users, and as discussed above, those merchant payment service accounts and user payment service accounts may be utilized in payment transactions between the merchants and user. For example, a merchant payment service account may be linked to one or more merchant payment accounts of the merchant (e.g., provided by an account provider), and a customer payment service account may be linked to one or more customer payment accounts of the customer (e.g., provided by an account provider). As such, a payment transaction may involve the payment service provider transferring funds from a customer payment account to a merchant payment account to pay for products purchased by the customer. In addition, the payment service provider may provide payment accounts to the merchant and/or customer for making payments as well.

In an embodiment of block 402, the payment service provider may provide the user a payment application that may be installed on a user device. The payment application may include instructions on a non-transitory machine-readable medium in the user device that, when executed by one or more hardware processors in the user device, cause the one or more hardware processors to perform the functions of the user devices discussed below. As such, actions performed by the user device as discussed below may be enabled by the payment application (or other applications). A user may associate their user payment service account (provided by the payment service provider) with the payment application by, for example, providing authentication credentials for the user payment service account to the payment application following the installation of the payment application on the user device. In addition, the payment application may retrieve information from the user device (e.g., a phone number or some other phone identifier)

and associate that information with the payment application and/or the user payment service account. As such, the payment application may be associated with the user, the user device, and/or the user payment service account to enable the performance of the method 400.

In some embodiments of block 402, upon or following the installation of the payment application on the user device, one or more user account authentication tokens may be provided on the user device. In some embodiments, the user account authentication token(s) may be included in the installation instructions for the payment application, and thus the installation of the payment application on the user device results in the provisioning of the user account authentication token(s) on the user device. As such, installation of the payment application on the user device may cause the user device to be "pre-loaded" with user account authentication tokens. In another embodiment, following the installation of the payment application on the user device, the payment application may operate (e.g., following the receipt and confirmation of user authentication credentials for the user payment service account) to communicate with the payment service provider over a network (e.g., the Internet) to retrieve the user account authentication tokens and store them on the user device. While a few examples have been provided, the provisioning of the user account authentication tokens on the user device may be performed in a variety of manners while remaining within the scope of the present disclosure.

In an embodiment, the user account authentication token(s) that are provided on the user device at block 402 may include an identifier for the user payment service account, authentication credential for the user payment service account, information about the user device, a challenge framework for requesting additional information to be exchanged, policy information such as constraints on the transaction or limits on a payment account, consumer preferences such as a desire to use personal identification numbers or thresholds, and/or a variety of other authentication token information known in the art. As discussed below, the user account authentication token(s) may be utilized during the method 400 by the payment service provider to determine and/or verify a user payment service account such that a payment code may be created or provided that enables the use of that user payment service account to make a payment, and thus may include any information that allows the payment service provider to verify a user identity, verify a user device identity, verify a user payment service account, ensure security of the information transmitted using the user account authentication token, and/or to otherwise safely and securely provide the payment codes discussed below. In an embodiment, a payment application may provide a limited number of user account authentication tokens on a user device (e.g., a set of 5 user account authentication tokens), and may then provide additional user account authentication tokens on the user device when those previously provided user account authentication tokens have been used up.

In an embodiment, a user may provide one or more user settings, preferences, and/or other information that define the operation of the payment application on the user device with respect to the automatic display of the payment codes discussed below. For example, a user may define which particular merchants that payment codes will be automatically displayed for, the types of merchants that payment codes will be automatically displayed for, the types of payment codes that will be automatically displayed, the security features that will be associated with the display of payment codes, and/or any other characteristic associated with the display of the payment codes discussed below. As such, the user may define how, when, and where a payment code will be automatically displayed according to the teachings below, thus customizing the automatic display of payments codes in a manner that is most convenient, efficient, and secure to the user.

Figure 5:
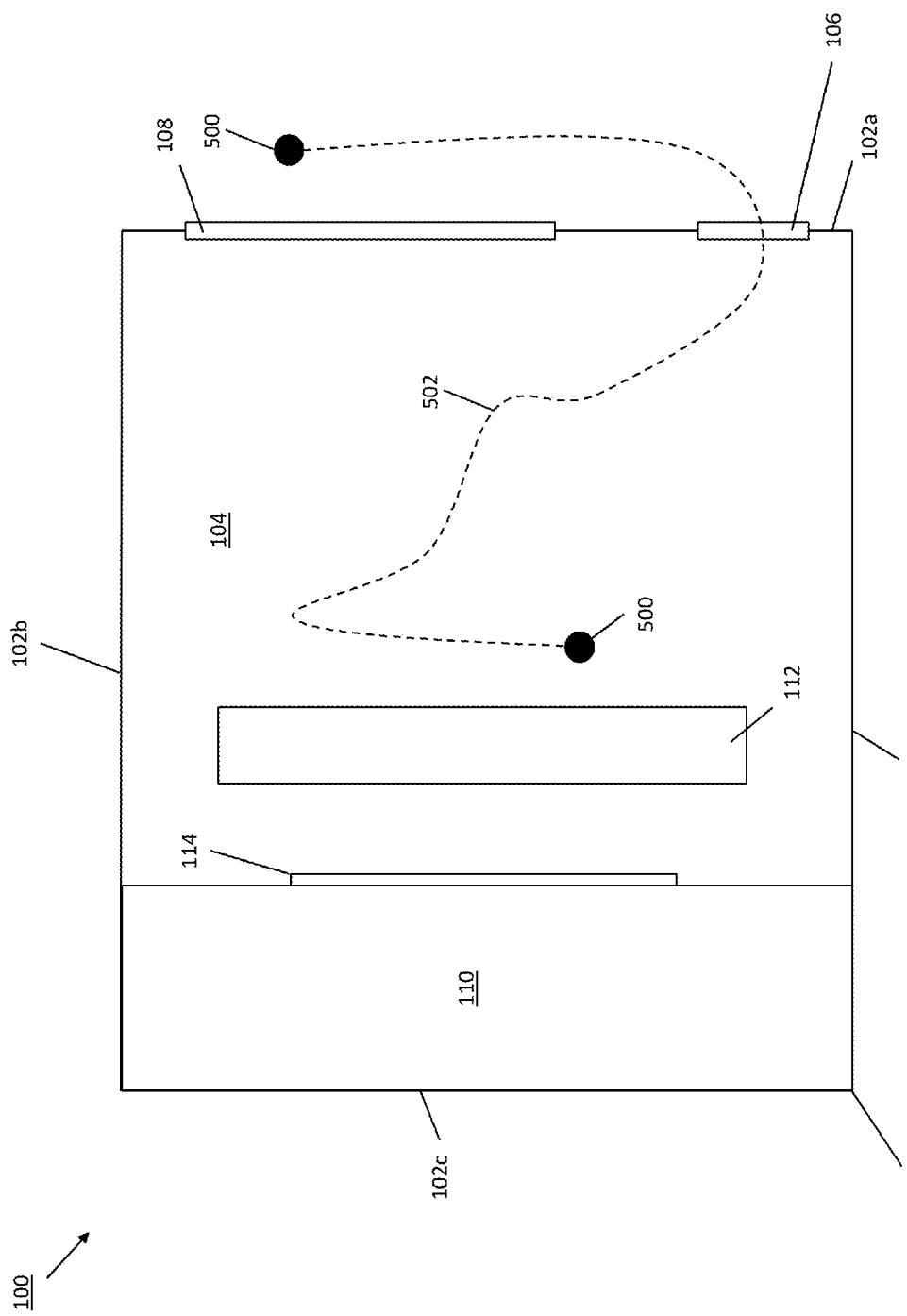
FIG. 5 is a schematic top view illustrating an embodiment of a user entering and moving around the physical merchant location of FIG. 1.

Referring now to FIGS. 3a, 3b, 4 and 5, the method 400 then proceeds to block 404 where a background communication process is established between a user device and a beacon system at a physical merchant location. FIG. 5 illustrates a user 500 approaching the physical merchant location 100 and entering the physical merchant location 100 along a path 502. As discussed above with reference to FIGS. 3a and 3b, the beacon system 300 includes a plurality of beacon device 200 that each provide a communication area 304 that may extend throughout the physical merchant location 100, as well as outside of the physical merchant location 100. In the embodiment illustrated in FIG. 5, the user 500 may have entered a communication area 304 provided by the beacon system 300 outside of the physical merchant location 100 (indicated by element 500 outside the exterior window 108) such that the user device of the user began communicating with the beacon system 300, and the user device may have continued communicating with the beacon system 300 throughout the path 502 of the user into the physical merchant location 100.

In an embodiment of block 404, upon entering a communication area 304 provided by a beacon device 200 in the beacon system 300, the user device may detect the beacon system 300 at the physical merchant location 100. For example, as discussed above, the user device may include a BLE communication system (or a BLE direct communication system) that continuously operates to search for other BLE communication systems. As such, upon entering the communication area 304 provided by a BLE communication system in a beacon device 200 of the beacon system 300 at the physical merchant location 100, the user device may detect the beacon system 300. In response to detecting the beacon system 300, the user device and the beacon system 300 may operate to establish a background communication process (e.g., through the beacon device 200 that is providing the communication area 304 within which the user device is located).

In an embodiment, the establishment of the background communication process includes an exchange of information between the beacon system 300 and the user device. For example, in some embodiments, the beacon system 300 may provide the user device information about the beacon system 300, information about the merchant that is associated with the merchant physical location 100 and that provides the beacon system 300, information that may be utilized to enable further communications with the beacon system 300, and/or a variety of other information that would be apparent to one of skill in the art in possession of the present disclosure. Similarly, the user device may provide the beacon system 300 information about the user device, information about the user that is associated with the user device, information that may be utilized to enable further communications with the user device, and/or a variety of other information that would be apparent to one of skill in the art in possession of the present disclosure.

In an embodiment, the background communication process is a background computing process that does not require any user intervention, instruction, or input to be established or performed. As such, the detection of the beacon system 300, the establishment of the background communication process, and the communications that occur using the background communication process are performed without input from the user (i.e., other than the possible settings, preferences, and/or other information that may be provided by the user for the payment application prior to entering a communication area 304 provided by a beacon device 200 to control how the payment application operates, as discussed above). As such, the background communication process may be established and performed by the user device without knowledge of the user including, for example, while the user device is stored is a pocket, purse, backpack, or other storage system of the user; while the user is using the user device for other purposes such as talking on the phone, browsing a website, or otherwise utilizing the user device; and/or according to a variety of other user device use scenarios known in the art. In some embodiments, the background communication process may also be characterized by being provided by the payment application (or other user device subsystem) without an associated user interface or operating system service. In yet another embodiment, the background communication process negates the need to go over-the-air (OTA) with the communications, as the background communication process may have its own direct connection to the network. However, one of skill in the art in possession of the present disclosure will recognize that a wide variety of background process techniques may be used to establish and perform the background communication process without the need for user intervention while remaining within the scope of the present disclosure.

Upon establishing the background communication process at block 404, the user device and the beacon system 300 may operate to communicate with each other via the background communication process to exchange any of a variety of information. For example, information exchanged between the user device and the beacon system 300 may be utilized such that the location of the user device in and around the physical merchant location 100 can be tracked. As such, FIG. 5 may illustrate an embodiment of the tracking of the user device from the point outside of the physical merchant location interior 104, along the path 502, and to the point in the physical merchant location interior 104. The location tracking illustrated in FIG. 5 may be enabled by the user device reporting its location to the beacon system 300, by the beacon system 300 determining the location of the user device based on signals received from the user device and different beacon devices 200a, and/or in a variety of other manners known in the art.

The method 400 then proceeds to block 406 where a user account authentication token is transmitted form the user device to the payment service provider device using the background communication process. As discussed above, the user device may include one or more user account authentication tokens that, in some embodiments, are included as part of or provided through the payment application from the payment service provider. In an embodiment of block 406, the user device selects a user account authentication token (e.g., a previously unused user account authentication token) and transmits that user account authentication token to the beacon system 300 using the background communication process (e.g., without any user intervention). In some embodiments, the payment application on the user device may use the information received from the beacon system 300 to verify that the beacon system 300 is authorized to receive the user account authentication token. For example, the merchant may register the beacon system 300 with the payment service provider, and that registration may be available to the payment application to verify that the beacon system 300 is authorized to receive the user account authentication token. However, in many embodiments, the user account authentication token may be encrypted such that its transmission to the beacon system 300 may be performed without any verification of the beacon system 300.

In an embodiment of block 406, the beacon system 300 may receive the user account authentication token from the user device and, in response, send the user account authentication token over a network to a payment service provider device of the payment service provider. For example, the beacon system 300 may utilize the merchant network communication device 302 to send the user account authentication token over the Internet to the payment service provider device. In an embodiment, the beacon system 300 may add beacon system information and/or merchant information to the user account authentication token before sending it to the payment service provider device. For example, information identifying the beacon system 300, the merchant, the physical merchant location 100, and/or other details of the merchant may be provided along with the user account authentication token to the payment service provider device.

The method 400 then proceeds to block 408 where a payment code is created and/or otherwise provided by the payment service provider device. In an embodiment, the payment service provider device receives the user account authentication token from the beacon system 300 and may determine a variety of information from the user account authentication token. In some examples, the payment service provider device may decrypt the user account authentication token to determine the information included in the user account authentication token. In some examples, the payment service provider device may determine the identity of the merchant associated with the merchant physical location be retrieving the identity of the beacon system 300 and/or the merchant that was provided along with the user account authentication token. In some examples, the payment service provider device may utilize a user account identifier and authentication credentials that are provided as part of the user account authentication token in order to determine a user account of a user associated with the user device from which the user account authentication token was received. While a few examples have been provided, one of skill in the art in possession of the present disclosure will recognize that a wide variety of information may be provided in or with the user account authentication token that would be useful in creating and/or otherwise providing the payment codes discussed below, and thus at block 408 the payment service provider device may retrieve any of that information for use in creating and/or otherwise providing the payment code discussed below.

The payment service provider device then operates to create a payment code, or may retrieve a previously created payment code, at block 408. In an embodiment, the payment service provider may use an identifier for the user payment service account of the user, user authentication credentials for the user payment service account, and an identifier for a merchant payment service account of the merchant to create the payment code. For example, the payment service provider device may create a code using, or associate a code with, the identity of the user payment service account, the user authentication credentials, and the identity of the merchant payment service account. Furthermore, other information may be used to create, or be associated with, the payment code created by the payment service provider device including, but not limited to, a time period that the payment code is valid, a merchant or merchants with whom the payment code is valid, a physical location or areas in which the payment code is valid, and/or any other payment code information. In some embodiments, the payment code may include a character string that may include letters, number, punctuation, symbols, and/or any other characters known in the art. In some embodiments, the payment code may include a visual code such as a Universal Product Code (UPC), a Quick Response (QR) code, and/or a variety of other visual codes known in the art. In an embodiment, the code may be a wirelessly transmitted code such as for example, a code that may be transmitted via a wireless communication system such as for example, a code that may be transmitted using Near Field Communication (NFC), Bluetooth, and/or a variety of other wireless transmission systems known in the art. In an embodiment, the code may be an optical code such as for example, a code that may be transmitted via a Light Emitting Diode (LED), a display, and/or a variety of other light producing devices known in the art. While a few examples have been provided, one of skill in the art will recognize that a wide variety of payment codes may be created that are associated with the user payment service account while remaining within the scope of the present disclosure.

In an embodiment, the payment code may be a one-time use code such that once that payment code is used to make a payment to a merchant, discussed below, the payment service provider will no longer accept that payment code for use in making a payment. In some embodiments, the payment code may be a multi-use code such that the payment service provider will accept that payment code for use in making multiple different payments to one or more merchants. In some embodiments, the payment code may be restricted in use to the merchant at the physical merchant location 100 (e.g., merchant payment service account information included in the payment code may restrict the use of that payment code to transferring funds from the user payment service account to the merchant payment service account of that merchant). In some embodiments, the payment code may be restricted in use to a predetermined time period such that following the predetermined time period the payment code will not be accepted by the payment service provider.

While the payment codes described herein are generally discussed as allowing a user to make a payment to a merchant from their payment account for a purchase amount, other types of payment codes will fall within the scope of the present disclosure. For example, payment codes may be created and/or provided at block 408 that include coupons, special offers, rewards purchases, and/or any other information that might be useful in an exchange between a user and a merchant. As such, the system provider device may retrieve information associated with the user and/or the merchant to determine whether the merchant is offering a coupon, whether the user has saved a coupon, whether the merchant is providing a special offer, whether the user has qualified for a rewards purchase, and/or other information that may then be used to create/provide the payment code at block 408.

The method 400 then proceeds to block 410 where the payment code is transmitted from the payment service provider device to the user device using the background communication process. In an embodiment, the payment service provider device transmits the payment code created at block 408 to the beacon system 300 over the network. For example, the payment service provider device may transmit the payment code over the Internet to the merchant network communication device 302, which then operates to transmit that payment code to one or more of the beacon devices 200.

In an embodiment of block 410, the beacon system 300 may receive the payment code from the payment service provider device and, in response, send the payment code to the user device using the background communication process. As such, the user device may receive the payment code from the beacon system 300 using the background communication process and without any intervention, input, or instructions from the user.

The method 300 then proceeds to block 412 where a payment code notification is provided on the user device. In an embodiment, in response to receiving the payment code at block 410, the user device operates to provide a payment code notification. In some of the examples discussed below, the payment code notification may include the payment code, while in other examples discussed below, the payment code notification may require some action by the user in order to display the payment code. As discussed below, the provisioning of the payment code notification may be performed as part of a background provisioning process that occurs without user intervention, input, or instructions. As such, the payment code notification may be provided on the user device to inform a user (who may be unaware that the payment code has been received by their user device) that the payment code has been received. While in the embodiments illustrated and discussed below, the provisioning of the payment code notification and/or the payment occurs through the display of the payment code notification and/or payment code, other methods of providing the payment code notification may include an audio notification, a tactile notification (e.g., a vibration of the user device that is indicative to the user of the user device receiving a payment code), and/or a variety of other notifications known in the art.

Figure 6:
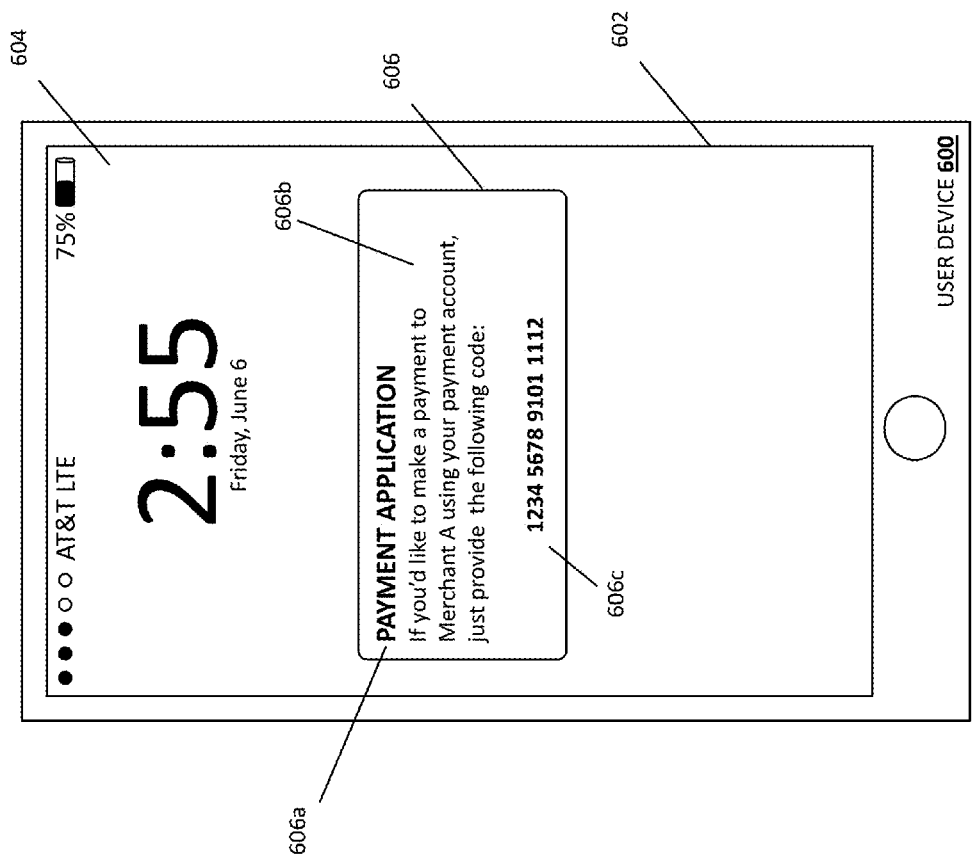
FIG. 6 is a front view illustrating an embodiment of a user device automatically displaying a payment code.

Referring now to FIG. 6, an embodiment of a user device 600 is illustrated that includes a display 602 displaying a lock screen 604. The lock screen 604 may be a user interface element provided by the operating system running on the user device 600, and may operate to regulate immediate access to the user device 600 by requiring that the user perform a particular action in order to access the functionality of the user device 600 such as, for example, providing authentication credentials, providing a particular button combination, performing a particular touch gesture or gestures, and/or a variety of other user lock screen actions known in the art. In the embodiment illustrated in FIG. 6, a payment code notification 606 is displayed on the lock screen 604 in a background display process that occurs without user intervention. However, the payment code notification 606 may be displayed on any of a variety of screens provided by the operating system other than lock screens, including home screens, application screens, and/or a variety of other user device screens known in the art.

The display of the payment code notification 606 on the lock screen 604 in the background display process may be provided using a variety of background display processes including providing the payment code notification 606 as a "pop-up" window, a text message, an appointment message, and/or a variety of other elements that may be displayed on the user device without the input, instruction, or intervention from the user. As such, in embodiments where a user that is not using their user device, the background communication process discussed above may result in the user device receiving the payment code, and the background display process may result in the payment code notification alerting the user via the unused user device 600 (e.g., by providing a sound, a tactile response, displaying the notification, etc.) that the payment code has been received and/or is available.

In embodiments where the user is currently using their user device, the background communication process discussed above may result in the user device receiving the payment code, and the background display process may result in the payment code notification alerting the user on the currently used user device 600 (e.g., by providing a sound, a tactile response, displaying the notification over a currently used application, etc.) that the payment code has been received and/or is available.

In the illustrated embodiment, the payment code notification 606 includes a payment application identifier 606a, a notification instruction 606b, and a payment code 606c. In some embodiments, the payment code notification 606 illustrated in FIG. 6 may be particularly beneficial for user devices that include operating systems that restrict those user devices to displaying text in background display processes such as the display of information on a lock screen. In some embodiments, the transmission of the user account authentication token at block 406 to the payment service provider device may include information about the capabilities (e.g., payment code display capabilities) of the user device 600 and/or its operating system, and those capabilities may be used by the payment service provider device to determine the type of payment code that should be transmitted. Additionally, the transmission of the user account authentication token at block 406 to the payment service provider device may include information about the capabilities (e.g., payment code acceptance capabilities) of the merchant device(s) at the physical merchant location 100 and/or their operating system(s), and those capabilities may be used by the payment service provider device to determine the type of payment code that should be transmitted.

As such, the payment service provider device may have determined at block 408 that the user device 600 can only display text in a background display process, and/or that the merchant device(s) at the physical merchant location only accept text payment codes, and thus created or otherwise provided that text payment code for transmission to the user device at block 410. The payment code notification 606 in FIG. 6 instructs the user (via the notification instruction 606b) that they may use the payment code 606c to make a payment to the merchant at the merchant physical location 100. As such, without intervention from the user subsequent to entering a communication area 304 provided by the beacon system 300 at the physical merchant location 100, the payment code 606c is retrieved and displayed on the user device 600. As discussed in further detail below, the user may then simply provide the payment code 606c to the merchant at the merchant physical location 100 in order to make a purchase from that merchant.

Referring now to FIG. 7, the user device 600 is illustrated displaying another embodiment of the lock screen 604 with a payment code notification 700. The payment code notification 700 includes a payment application identifier 700a, a notification instruction 700b, and a payment code 700c. In some embodiments, the payment code notification 700 illustrated in FIG. 7 may be particularly beneficial for user devices that include operating systems that allow user devices to display images in background display processes such as the display of an image on a lock screen. Similarly as discussed above, the payment service provider device may have determined at block 408 that the user device 600 can display images in a background display process, and/or that the merchant device(s) at the physical merchant location accept image payment codes, and thus created or otherwise provided that image payment code (a QR code in the illustrated embodiment) for transmission to the user device at block 410. The payment code notification 700 in FIG. 7 instructs the user (via the notification instruction 700b) that they may use the payment code 700c to make a payment to the merchant at the merchant physical location 100. As such, without intervention from the user subsequent to entering a communication area 304 provided by the beacon system 300 at the physical merchant location 100, the payment code 700c is retrieved and displayed on the user device 600. As discussed in further detail below, the user may then simply provide the payment code 700c to the merchant at the merchant physical location 100 in order to make a purchase from that merchant.

Figure 8B:
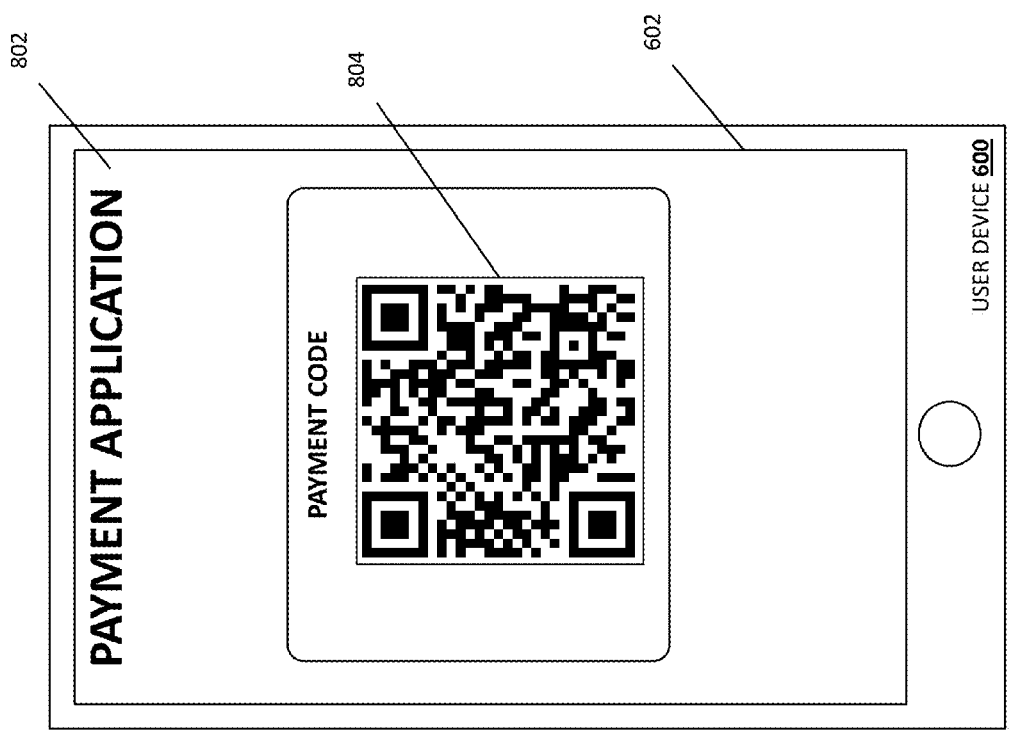

Referring now to FIGS. 8a and 8b, the user device 600 is illustrated displaying another embodiment of the lock screen 604 with a payment code notification 800. The payment code notification 800 includes a payment application identifier 800a, a notification instruction 800b, and a user action section 800c. In some embodiments, the payment code notification 800 illustrated in FIG. 8a may be particularly beneficial for user devices that include operating systems that do not allow user devices to display images in background display processes such as the display of information on a lock screen. Similarly as discussed above, the payment service provider device may have determined at block 408 that the user device 600 cannot display images in a background display process, but that the merchant device(s) at the physical merchant location accept image payment codes, and thus created or otherwise provided that image payment code (a QR code in the illustrated embodiment) for transmission to the user device at block 410.

The payment code notification 800 in FIG. 8 instructs the user (via the notification instruction 800b) to perform a user action using the user action section 800c in order to access the payment code received by the user device 600 at block 410. While the illustrated embodiment includes a user action section 800c that requires a user input such as a "swipe" touch input, other user action section may require user actions such as the provision of a passcode, an authentication touch gesture, a spoken authentication, a fingerprint scan, and/or a variety of other user actions known in the art. Upon receiving the user input associated with the requested user action using the user action section 800c, the payment application on the user device 600 may provide a payment application screen 802 including a payment code 804 that, in the embodiment illustrated in FIG. 8b, includes a QR code. As such, without intervention from the user subsequent to entering a communication area 304 provided by the beacon system 300 at the physical merchant location 100, the payment code 700c is retrieved, and that payment code 804 may quickly and easily be displayed on the user device 600 in response to a user action provided in response to a payment code notification. As discussed in further detail below, the user may then simply provide the payment code to the merchant at the merchant physical location 100 in order to make a payment to that merchant.

Following the provision of the payment code on the user device, the user may use the payment code to make a purchase from the merchant at the physical merchant location 100, or may disregard the payment code if the user does not wish to make a purchase from the merchant at the physical merchant location 100. In some embodiments, the user at the physical merchant location 100 may select food to purchase from the merchant, and upon the merchant providing a purchase amount for the selected food, the user may then provide the payment code to the merchant. For example, the user may allow the merchant to view the displayed payment code 606c illustrated in FIG. 6, may read off the displayed payment code 606c to the merchant, and/or may otherwise provide the payment code 606c to the merchant such that the merchant can enter the payment code 606c into a point of sale (POS) device or other payment processing device. In another example, the user may provide the displayed payment code 700c or 804, illustrated in FIGS. 7 and 8b, respectively, to a scanning device (e.g., a QR code scanner) or other payment code reading device that is coupled to a payment processing device at the physical merchant location 100. In another example, the user may execute an audio file of the payment code such that an audio recognition device at the physical merchant location 100 may receive the payment code information. While a few examples have been provided, the provision of the payment code to a merchant may be performed in a variety of other manners while remaining within the scope of the present disclosure. If the user does not desire to purchase anything from the merchant at the physical merchant location 100 and ignores the payment code notification, the user device may stop displaying the payment code after a predetermined amount of time.

Upon receiving the payment code, the payment processing device at the merchant physical location 100 may transmit the payment code over the network to the payment service provider device, along with purchase details that may include the purchase amount, the goods being purchased, and/or any other information relevant to the purchase transaction between the user and the merchant. The payment service provider device may then use the information included in, and provided along with, the payment code to determine the user payment service account and the merchant payment service account, and may operate to transfer funds equal to the purchase amount from the user payment service account (or a user payment account associated with that user payment service account) to the merchant payment service account (or a merchant payment account associated with that merchant payment service account). The payment service provider device may notify the merchant device that the funds have been (or will be) transferred from the user payment service account to the merchant payment service account such that the merchant may be assured that any products purchased by the user have been paid for. In embodiments where the payment code was created and/or provided to incorporate a coupon, special offer, rewards purchase, the system provider device may then use the coupon, special offer, rewards purchase, and/or other information to adjust the payment amount as necessary.

Thus, systems and methods for displaying a payment code have been provided that utilize a background communication process, which may be performed between a beacon system at a physical merchant location and a user device that enters a communication area associated with that physical merchant location, to transmit a payment code to the user device without the need for any user intervention. That payment code may then be displayed or otherwise provided by the user device, and if the user desires to make a payment to the merchant at the merchant physical location, the user may simply provide that payment code to the merchant. The systems and methods of the present disclosure greatly simplify the retrieval and display of payment codes, making the provisioning of that payment code to a merchant by a user as simple as simply removing their user device from their pocket. Such systems and methods are expected to greatly increase the adoption of user device payment systems which have, up to this point in time, been delayed due to the cumbersome procedures required to retrieve and display payment codes.

While the examples above of the automatic payment code provisioning system are directed to quickly and easily providing a payment code to a merchant to perform a transaction involving a payment service provider, the teachings of the present disclosure may be applied to the automatic provisioning of codes to any entity requesting that code. For example, the teachings of the present disclosure may be utilized at an airline and/or airport such that a user entering an airport may have their airline/airport security access code automatically provided on their user device for provision to airport security to enter the airport and/or to an airline employee to enter an airplane gate and access and airplane. In another example, the teachings of the present disclosure may be utilized at an event such as a music event or sporting event such that a user entering an event venue may have their ticketing code automatically provided on their user device for provision to venue security to enter the venue or access particular areas of the venue. In yet another example, the teachings of the present disclosure may be utilized at a rental agency such as a car rental agency such that a user entering rental location may have their rental code automatically provided on their user device for provision to a rental employee to quickly and easily retrieve their rental car. Thus, while a few examples of the automatic provisioning of codes on a user device have been provided, one of skill in the art in possession of the present disclosure will recognize that a wide variety of entities that utilize codes for user access, user verification, and/or other purposes will benefit from the teachings of the present disclosure and fall within its scope.

Figure 9:
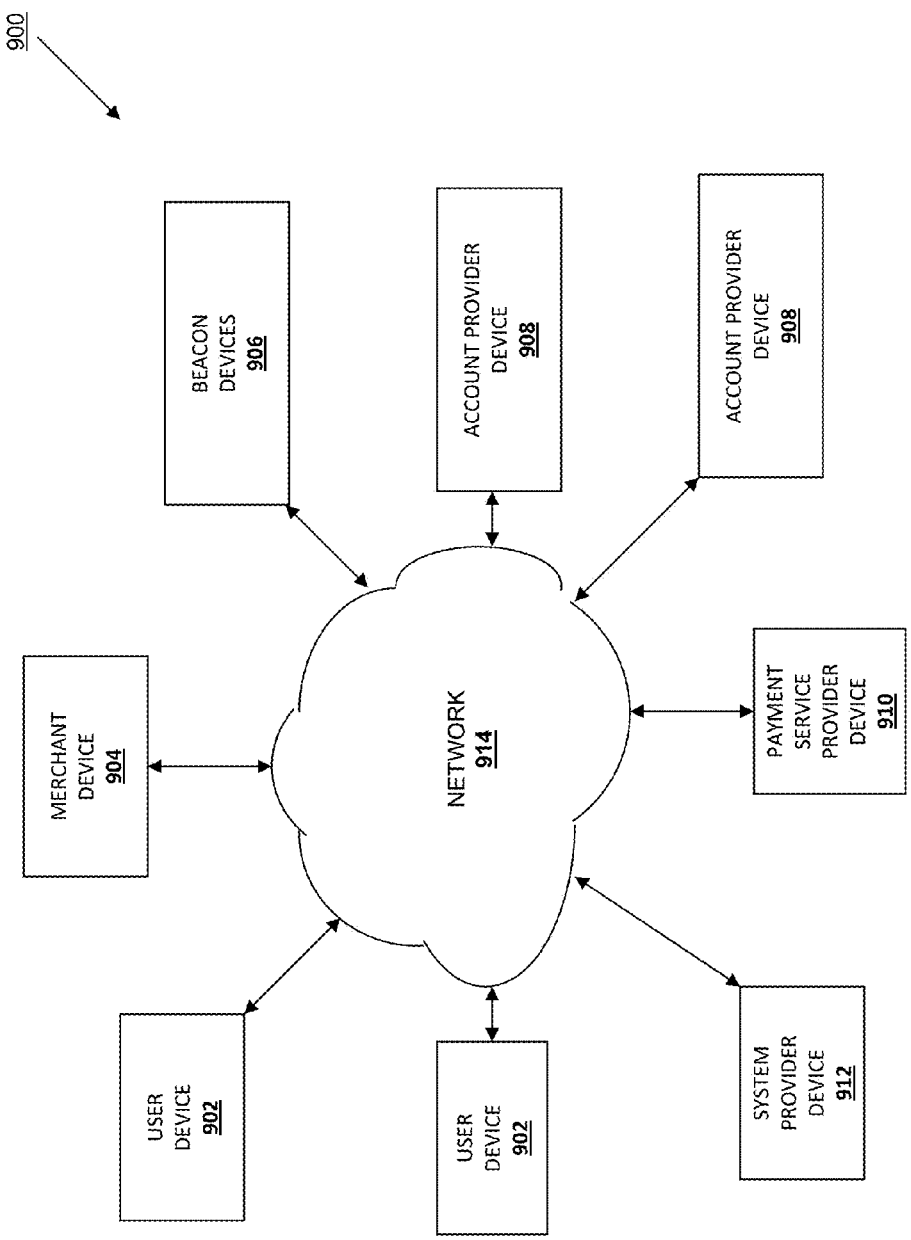
FIG. 9 is a schematic view illustrating an embodiment of a networked system.

Referring now to FIG. 9, an embodiment of a network-based system 900 for implementing one or more processes described herein is illustrated. As shown, the network-based system 900 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 9 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 900 illustrated in FIG. 9 includes a plurality of user devices 902, a plurality of merchant devices 904, a plurality of beacon devices 906, a plurality of account provider devices 908, a payment service provider device 910, and/or a system provider device 912 in communication over one or more networks 914. The user devices 902 may be the user devices discussed above and may be operated by the users discussed above. The merchant devices 904 and beacon devices 906 may be the merchant devices and beacon devices discussed above and may be operated by the merchants discussed above as well as, in some embodiments, the system provider as well. The account provider device 908 may be the account provider devices discussed above and may be operated by the account providers discussed above which may include checking account providers, savings account providers, credit account providers, and/or a variety of other account providers known in the art. The payment service provider device 910 may be the payment service provider devices discussed above and may be operated by a payment service provider such as, for example, PayPal Inc. of San Jose, Calif. The system provider devices 912 may be the system provider devices discussed above and may be operated by the system providers discussed above.

The user devices 902, merchant devices 904, beacon devices 906, account provider devices 908, payment service provider device 910, and/or system provider device 912 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 914.

The network 914 may be implemented as a single network or a combination of multiple networks. For example, in various embodiments, the network 914 may include the Internet and/or one or more intranets, landline networks, wireless networks, and/or other appropriate types of networks.

The user devices 902 may be implemented using any appropriate combination of hardware and/or software configured for wired and/or wireless communication over network 914. For example, in one embodiment, the user devices 902 may be implemented as a personal computer of a user in communication with the Internet. In other embodiments, the user devices 902 may be a smart phone, personal digital assistant (PDA), laptop computer, and/or other types of computing devices.

The user devices 902 may include one or more browser applications which may be used, for example, to provide a convenient interface to permit the user to browse information available over the network 914. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 902. In particular, the other applications may include a payment application for payments assisted by a payment service provider through the payment service provider device 910. The other applications may also include security applications for implementing customer-side security features, programmatic customer applications for interfacing with appropriate application programming interfaces (APIs) over the network 914, or other types of applications. Email and/or text applications may also be included, which allow user to send and receive emails and/or text messages through the network 914. The user devices 902 includes one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used by the payment service provider device 910 to associate the user with a particular account as further described herein.

The merchant devices 904 may be maintained, for example, by a conventional or on-line merchant, conventional or digital goods seller, individual seller, and/or application developer offering various products and/or services in exchange for payment to be received conventionally or over the network 914. In this regard, the merchant devices 904 may include a database identifying available products and/or services (e.g., collectively referred to as items) which may be made available for viewing and purchase by the user.

The merchant devices 904 also include a checkout application which may be configured to facilitate the purchase by the payer of items. The checkout application may be configured to accept payment information from the user through the user devices 902 and/or from the payment service provider through the payment service provider device 910 over the network 914.

Figure 10:
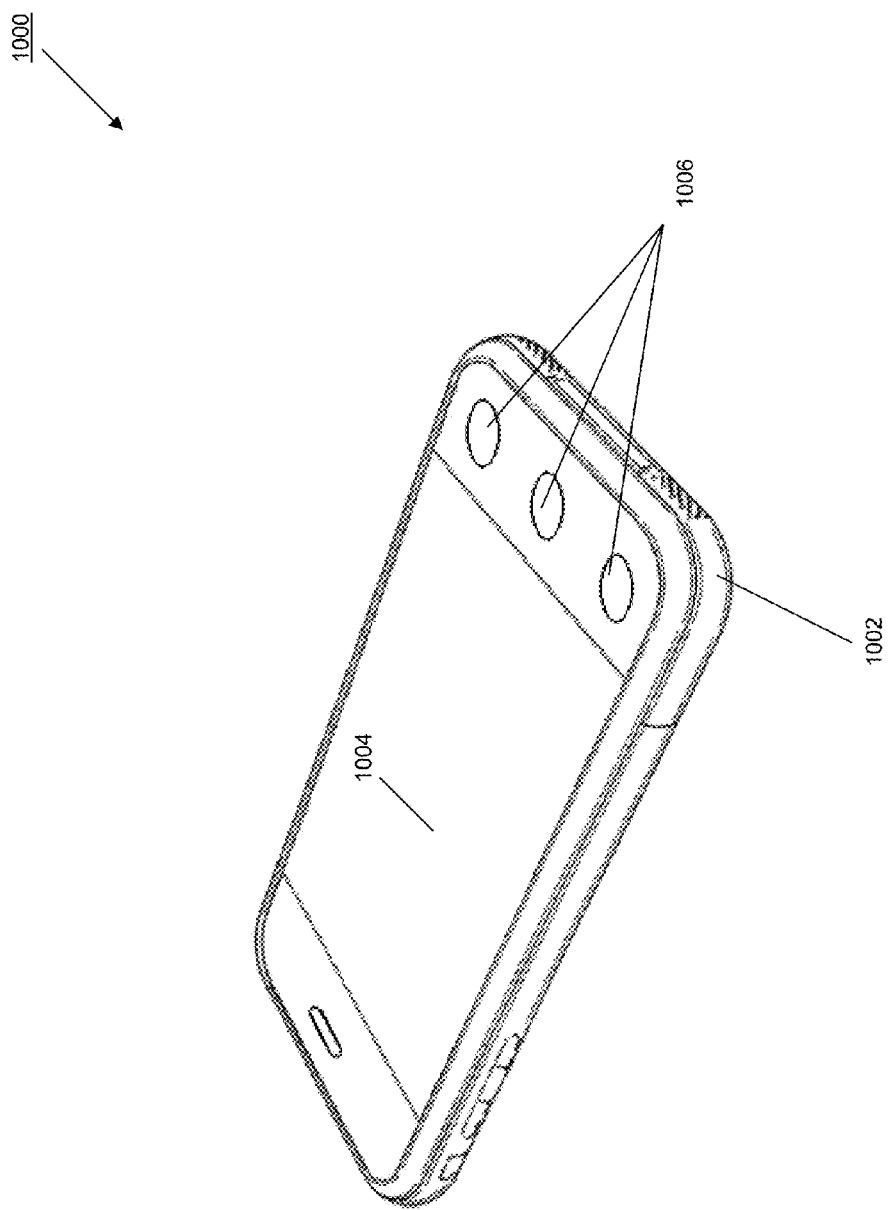
FIG. 10 is a perspective view illustrating an embodiment of a user device.

Referring now to FIG. 10 an embodiment of a user device 1000 is illustrated. The user device 1000 may be the user devices discussed above. The user device 1000 includes a chassis 1002 having a display 1004 and an input device including the display 1004 and a plurality of input buttons 1006. One of skill in the art will recognize that the user device 1000 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 11:
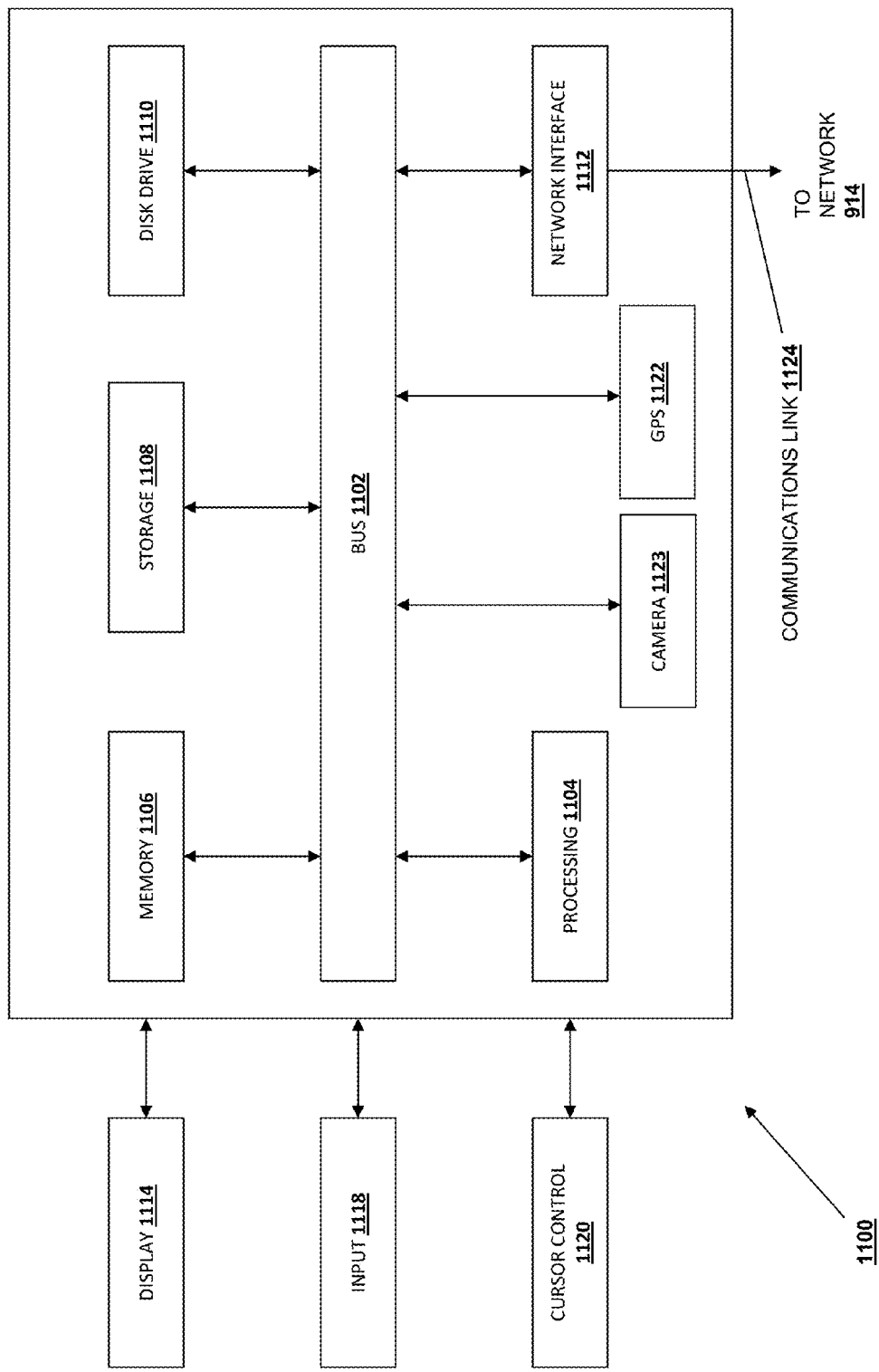
FIG. 11 is a schematic view illustrating an embodiment of a computer system.

Referring now to FIG. 11, an embodiment of a computer system 1100 suitable for implementing, for example, the user devices, merchant devices, beacon devices, account provider devices, payment service provider device, and/or the system provider device, discussed above, is illustrated. It should be appreciated that other devices utilized by customers, merchants, payment service providers, account providers, and/or system providers in the system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), a location determination component 1122 (e.g., a Global Positioning System (GPS) device as illustrated, a cell tower triangulation device, and/or a variety of other location determination devices known in the art), and/or a camera component 1123. In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the user devices, merchant devices, beacon devices, account provider devices, payment service provider device, and/or system provider device. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 914 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Figure 12:
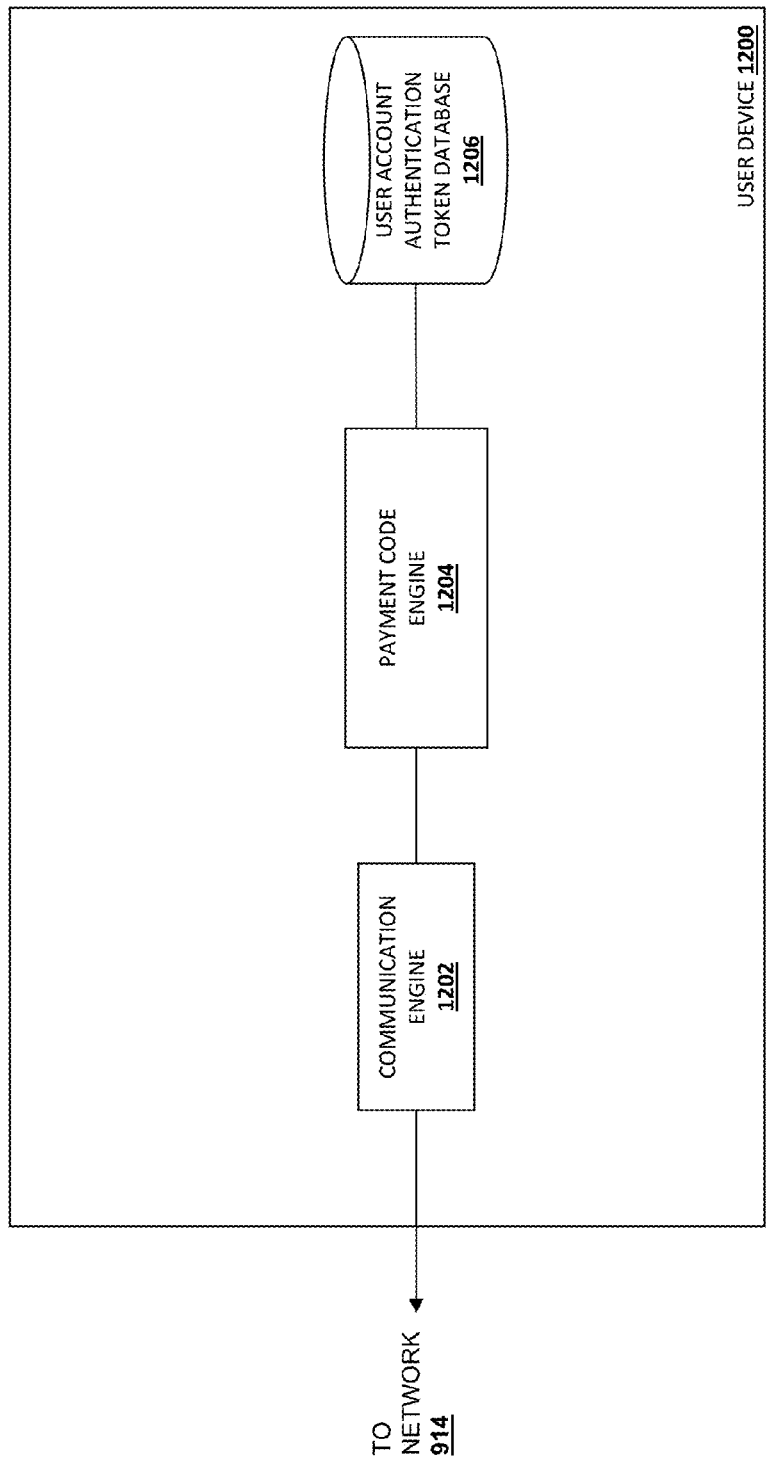
FIG. 12 is a schematic view illustrating an embodiment of a user device.

Referring now to FIG. 12, an embodiment of a user device 1200 is illustrated. In an embodiment, the device 1200 may be the user devices discussed above. The device 1200 includes a communication engine 1202 that is coupled to the network 914 and to a payment code engine 1204 that is coupled to a user account authentication token database 1206. The communication engine 1202 may be software or instructions stored on a computer-readable medium that allows the device 1200 to send and receive information over the network 914. The payment code engine 1204 may be software or instructions stored on a computer-readable medium that is configured to detect a beacon system, establish a background communication process with the beacon system, retrieve a user account authentication token from the user account authentication token database 1206 and send it to the beacon system, receive a payment code from the beacon system, provide a payment code notification (e.g., for display), provide a payment code (e.g., for display), and/or provide any of the other functionality that is discussed above. While the user account authentication token database 1206 has been illustrated as a single database that is located in the device 1200, one of skill in the art will recognize that it may include multiple database and be connected to the payment code engine 1204 through the network 914 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An automatic payment code display system, comprising:
    a non-transitory memory storing an encrypted user account authentication token that is configured to be decrypted to access a user payment account identifier that identifies a user payment account and authentication credentials for the user payment account; and one or more hardware processors coupled to the non-transitory memory and configured to execute instructions to cause the system to perform operations comprising:
   detecting a wireless communication system at a physical merchant location;
   establishing a background communication process with the wireless communication system, wherein the background communication process occurs without user intervention subsequent to detecting the wireless communication system;
   providing, through the wireless communication system as part of the background communication process, the encrypted user account authentication token to a payment provider system;
   receiving, through the wireless communication system as part of the background communication process, a payment code generated by the payment provider system in response to receiving and decrypting the encrypted user account authentication token; and
   causing, in a background display process that occurs without user intervention, the payment code to be displayed on a lock screen of a user device, wherein the payment code is configured to be utilized by a payment processing device at the physical merchant location to perform a payment transaction using the user payment account.

2. The system of claim 1, wherein the operations further comprise:
   providing, through the wireless communication system as part of the background communication process, payment code display information along with the encrypted user account authentication token to the payment provider system, wherein the payment code display information indicates a type of payment code that is generated by the payment provider system.

3. The system of claim 1, wherein the operations further comprise:
   causing, in the background display process that occurs without user intervention, a payment code notification to be displayed on the lock screen; and
   detecting a user input that was instructed by the payment code notification and, in response, causing the payment code to be displayed on the lock screen.

4. The system of claim 1, wherein the payment code is configured to scanned by a scanning device that is coupled to the payment processing device.

5. The system of claim 1, wherein the operations further comprise:
   receiving the encrypted user account authentication token over a network from the payment provider system; and
   storing the encrypted user account authentication token in the non-transitory memory.

6. The system of claim 1, wherein the payment code encodes the user payment account identifier for the user payment account and a merchant payment account identifier for a merchant payment account.

7. A method for automatically displaying a payment code, comprising:
   detecting, by a user device, a wireless communication system at a physical merchant location;
   establishing, by the user device, a background communication process with the wireless communication system, wherein the background communication process occurs without user intervention subsequent to detecting the wireless communication system;
   providing, by the user device through the wireless communication system as part of the background communication process, an encrypted user account authentication token that is stored in a database to a payment provider system, wherein the encrypted user account authentication token is configured to be decrypted to access a user payment account identifier that identifies a user payment account and authentication credentials for the user payment account;
   receiving, by the user device through the wireless communication system as part of the background communication process, a payment code generated by the payment provider system in response to receiving and decrypting the encrypted user account authentication token; and
   causing, by the user device in a background display process that occurs without user intervention, the payment code to be displayed on a lock screen of a user device, wherein the payment code is configured to be utilized by a payment processing device at the physical merchant location to perform a payment transaction using the user payment account.

8. The method of claim 7, further comprising:
   providing, by the user device through the wireless communication system as part of the background communication process, payment code display information along with the encrypted user account authentication token to the payment provider system, wherein the payment code display information indicates a type of payment code that is generated by the payment provider system.

9. The method of claim 7, further comprising:
   causing, by the user device in the background display process that occurs without user intervention, a payment code notification to be displayed on the lock screen; and
   detecting, by the user device, a user input that was instructed by the payment code notification and, in response, causing the payment code to be displayed on the lock screen.

10. The method of claim 7, further comprising:
    forwarding, by the wireless communication system, the encrypted user account authentication token to a payment service provider device over a network; and
    receiving, by the wireless communication system, the payment code from the payment provider system over the network.

11. The method of claim 7, further comprising:
    receiving, by the payment provider system, payment information associated with the payment code over the network from the payment processing device; and
    transferring, by the payment provider system, funds from the user payment account of a user associated with the user device to a merchant account of a merchant associated with the merchant physical location.

12. The method of claim 7, further comprising:
    receiving, by the user device, the encrypted user account authentication token over a network from a payment service provider device; and
    storing, by the user device, the encrypted user account authentication token in the database.

13. The method of claim 7, wherein the payment code is a one-time use code that is restricted in use to the physical merchant location.

14. A non-transitory machine-readable medium having stored thereon machine-readable instructions executable to cause a machine to perform operations comprising:

detecting a wireless communication system at a physical merchant location;

establishing a background communication process with the wireless communication system, wherein the background communication process occurs without user intervention subsequent to detecting the wireless communication system;

providing, through the wireless communication system as part of the background communication process, at least one of a plurality of encrypted user account authentication tokens that are stored in a database to a payment provider system, wherein the at least one of the plurality of encrypted user account authentication tokens is configured to be decrypted to access a user payment account identifier that identifies a user payment account and authentication credentials for the user payment account;

receiving, through the wireless communication system as part of the background communication process, a payment code generated by the payment provider system in response to receiving and decrypting the encrypted user account authentication token; and causing, in a background display process that occurs without user intervention, the payment code to be displayed on a lock screen of a user device, wherein the payment code is configured to be utilized by a payment processing device at the physical merchant location to perform a payment transaction using the user account.

15. The non-transitory machine-readable medium of claim 14, wherein the operations further comprise:

providing, through the wireless communication system as part of the background communication process, payment code display information along with the encrypted user account authentication token to the payment provider system, wherein the payment code display information indicates a type of payment code that is generated by the payment provider system.

16. The non-transitory machine-readable medium of claim 14, wherein the operations further comprises:

causing, in the background display process that occurs without user intervention, a payment code notification to be displayed on the lock screen; and detecting a user input that was instructed by the payment code notification and, in response, causing the payment code to be displayed on the lock screen.

17. The non-transitory machine-readable medium of claim 14, wherein the payment code is a Quick Response (QR) code that is configured to provide user payment account information for the user payment account to a QR code reader device that is coupled to the payment processing device.

18. The non-transitory machine-readable medium of claim 14, wherein the operations further comprises:

receiving a first set of the plurality of encrypted user account authentication tokens over a network from the payment provider system;

storing the first set of the plurality of encrypted user account authentication tokens;

receiving a second set of the plurality of encrypted user account authentication tokens over a network from the payment provider system; and storing the second set of the plurality of encrypted user account authentication tokens.

19. The non-transitory machine-readable medium of claim 18, wherein the payment code encodes the user payment account identifier for the user payment account, the authentication credentials for the user payment account, and a merchant identifier for a merchant associated with the merchant physical location.

20. The non-transitory machine-readable medium of claim 14, wherein the payment code is a one-time use code that is restricted in use to a predetermined time period.

* * * * *